United States Patent
Berzin et al.

(10) Patent No.: US 10,111,085 B2
(45) Date of Patent: Oct. 23, 2018

(54) IOT PROFILES AND NETWORK USAGE TRACKING AND CHARGING BASED ON RAN EVENTS

(71) Applicant: Verizon Patent and Licensing Inc., Arlington, VA (US)

(72) Inventors: Oleg L. Berzin, Huntingdon Valley, PA (US); Yueping Zhang, Princeton, NJ (US); Chris M Okoniewski, Florence, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/299,695

(22) Filed: Oct. 21, 2016

(65) Prior Publication Data
US 2018/0115885 A1 Apr. 26, 2018

(51) Int. Cl.
*H04M 11/00* (2006.01)
*H04W 8/18* (2009.01)
*H04M 15/00* (2006.01)
*H04W 4/24* (2018.01)
*H04W 24/10* (2009.01)
*H04W 76/27* (2018.01)

(52) U.S. Cl.
CPC .............. *H04W 8/18* (2013.01); *H04M 15/58* (2013.01); *H04W 4/24* (2013.01); *H04W 24/10* (2013.01); *H04W 76/27* (2018.02)

(58) Field of Classification Search
CPC ......... H04W 8/18; H04W 4/24; H04W 24/10; H04W 76/27; H04M 15/58
See application file for complete search history.

(56) References Cited

U.S. PATENT DOCUMENTS

| | | | | |
|---|---|---|---|---|
| 2012/0207034 | A1* | 8/2012 | Ivanov | H04L 41/5035 370/252 |
| 2014/0295790 | A1* | 10/2014 | Vos | H04M 15/60 455/406 |
| 2017/0006528 | A1* | 1/2017 | Bari | H04W 48/16 |

* cited by examiner

*Primary Examiner* — Wayne H Cai

(57) ABSTRACT

RAN events associated with IoT devices may be monitored and tracked. Profiles may be defined for different IoT devices. The profiles may specify resource limits for the IoT devices, including resource limits based on the RAN events. The IoT profiles may also define policy responses based on the occurrence of the RAN events. The policy responses may include charging rules, network access control rules, or other rules based on the resource usage of the IoT devices.

20 Claims, 7 Drawing Sheets

IOT PROFILES AND NETWORK USAGE TRACKING AND CHARGING BASED ON RAN EVENTS

BACKGROUND

Cellular wireless networks may be used as a platform for Internet of Things (IoT) connectivity, which may also be referred to as Cellular-based IoT (CIoT). The extensive footprint, high reliability, and security features of wireless cellular networks can be ideal for servicing IoT devices.

Many IoT devices perform relatively infrequent small data transmissions. IoT devices may generally be characterized as using low bandwidth and non-urgent communications. IoT devices may include sensor devices (e.g., a temperature sensor, a utility meter reading device, etc.) that are designed to take a measurement and then upload the measurement.

To the operator of the cellular network, IoT devices can present challenges to the operation of the network. Compared to "standard" User Equipment (UE) devices, such as cellular telephones for use by human users, IoT devices may have little impact on the core portion of the cellular network and a relatively higher impact to the Radio Access Network (RAN) portion of the cellular network. For example, a low bandwidth IoT device may frequently attach, and detach from the RAN, but yet transmit relatively little user data.

BRIEF DESCRIPTION OF THE DRAWINGS

Embodiments of the present disclosure will be readily understood by the following detailed description in conjunction with the accompanying drawings. To facilitate this description, like reference numerals may designate like structural elements. Embodiments of the disclosure are illustrated by way of example and not by way of limitation in the figures of the accompanying drawings.

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the appended claims and their equivalents.

Consistent with aspects described herein, RAN events associated with IoT devices may be monitored and tracked. "RAN events," as used herein, may generally refer to signaling between IoT devices and base stations in the network. That is, RAN events may refer to signaling in the radio (air) interface portion of the cellular network. In one implementation, the RAN events may include communications in the Radio Resource Control (RRC) layer between an IoT device and a base station. The RAN events may particularly include, for example, an RRC Radio Access Attach operation, an RRC Radio Access Detach operation, a radio bearer Service Request operation, and/or a radio bearer Service Release operation.

Profiles may be defined for different IoT devices. The profiles, called IoT profiles herein, may specify resource limits for the IoT devices, including resource limits based on the RAN events. The IoT profiles may also define policy responses based on the occurrence of the RAN events. The policy responses may include charging rules, network access control rules, or other rules based on the resource usage of the IoT devices.

With the techniques described herein, charging and/or access controls may be specified, for IoT devices, based on resource usage that includes RAN events. In this manner, IoT devices, which may potentially place a relatively large burden on the RAN resources, can be effectively charged and controlled based on the impact of the IoT devices on the RAN.

Figure 1:
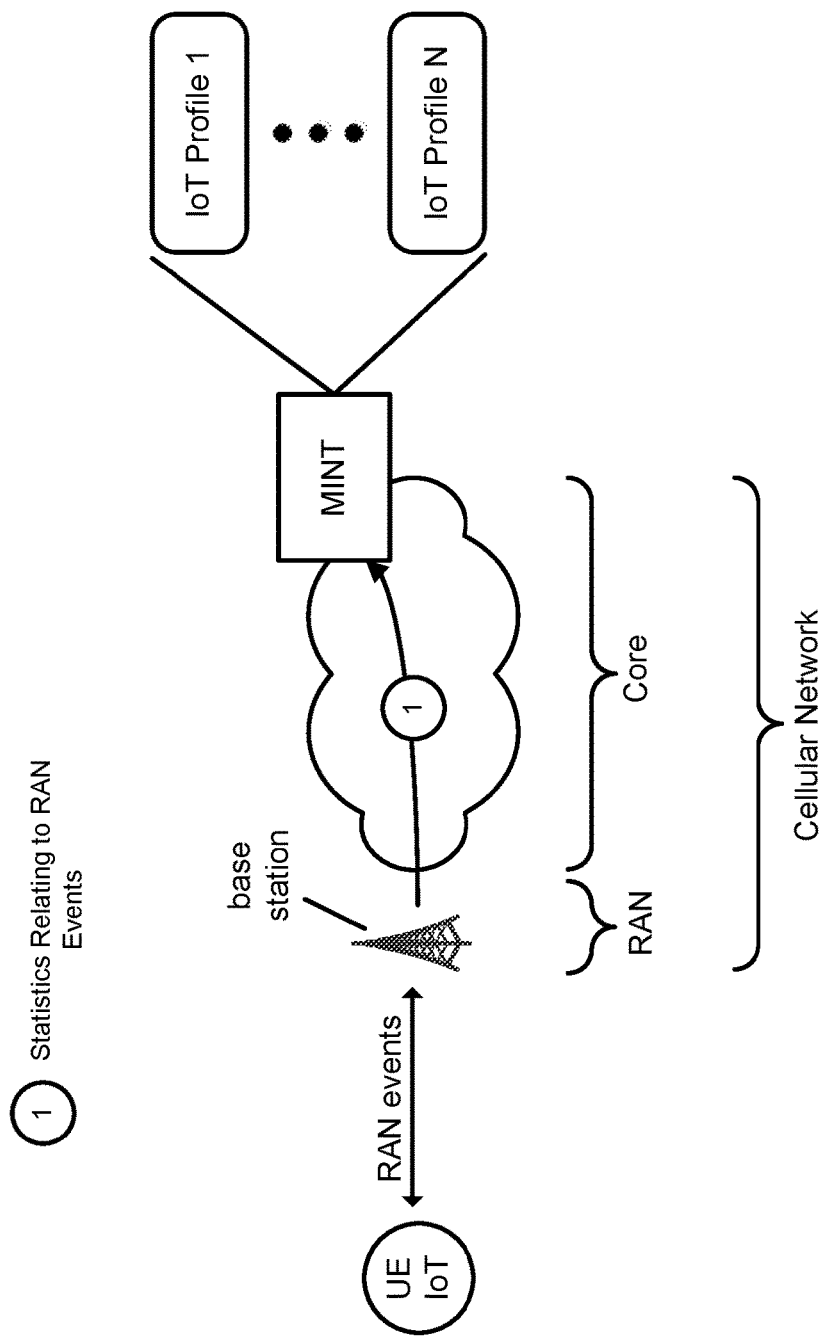
FIG. 1 is a diagram conceptually illustrating an overview of concepts described herein.

FIG. 1 is a diagram conceptually illustrating an overview of concepts described herein. As shown in FIG. 1, an IoT device ("UE IoT") may obtain network connectivity through a cellular network. The cellular network may include a RAN portion and a core portion. The RAN portion may implement one or more radio access technologies (RATs) to wirelessly connect to the IoT device. The core portion of the cellular network may provide control and backhaul functionality to connect the IoT device to one or more external networks and/or servers.

As shown in FIG. 1, processes, such as processes associated with a server (or another device or devices) in the cellular network, referred to herein as a Machine Interface Network Treatment (MINT) component, may maintain IoT profiles for IoT devices (shown as "IoT Profile 1" through "IoT Profile N"). An IoT profile may include information relating to network resources that may be used by particular IoT devices, including resources relating to usage of the RAN control plane. The resources that are used by particular IoT devices, may be tracked by nodes, such as base stations, in the RAN, and communicated to the MINT component (at (1), "Statistics Relating to RAN Events"). The MINT component may aggregate resource statistics from the IoT devices, generate charging items for the IoT devices, and/or communicate with other network devices to control network access by the IoT devices.

The IoT profiles may also include policy rules relating to actions that are to be taken when an IoT device exceeds an amount of allotted resource request. For example, an IoT device may be permitted a certain number of RRC Radio Access Attach requests per day (or per some other time period). If the IoT device exceeds the permitted number, depending on the IoT profile associated with the IoT device, the account associated with the IoT device may be charged extra, network access to the IoT device may be limited or shut off, and/or other actions may be taken.

In some implementations, a particular IoT profile may apply to a group of IoT devices and the applicable resource limits may be aggregated among the group of IoT devices.

For example, a customer may deploy a large number of IoT devices, such as sensors installed in shoes, and contract for all of the deployed IoT devices to use, in total, a certain amount of resources. The resource limits for the group of IoT devices, and charges or other actions that are to be taken for the resource usage of the group, may be included in the IoT profile for the group.

Figure 2:
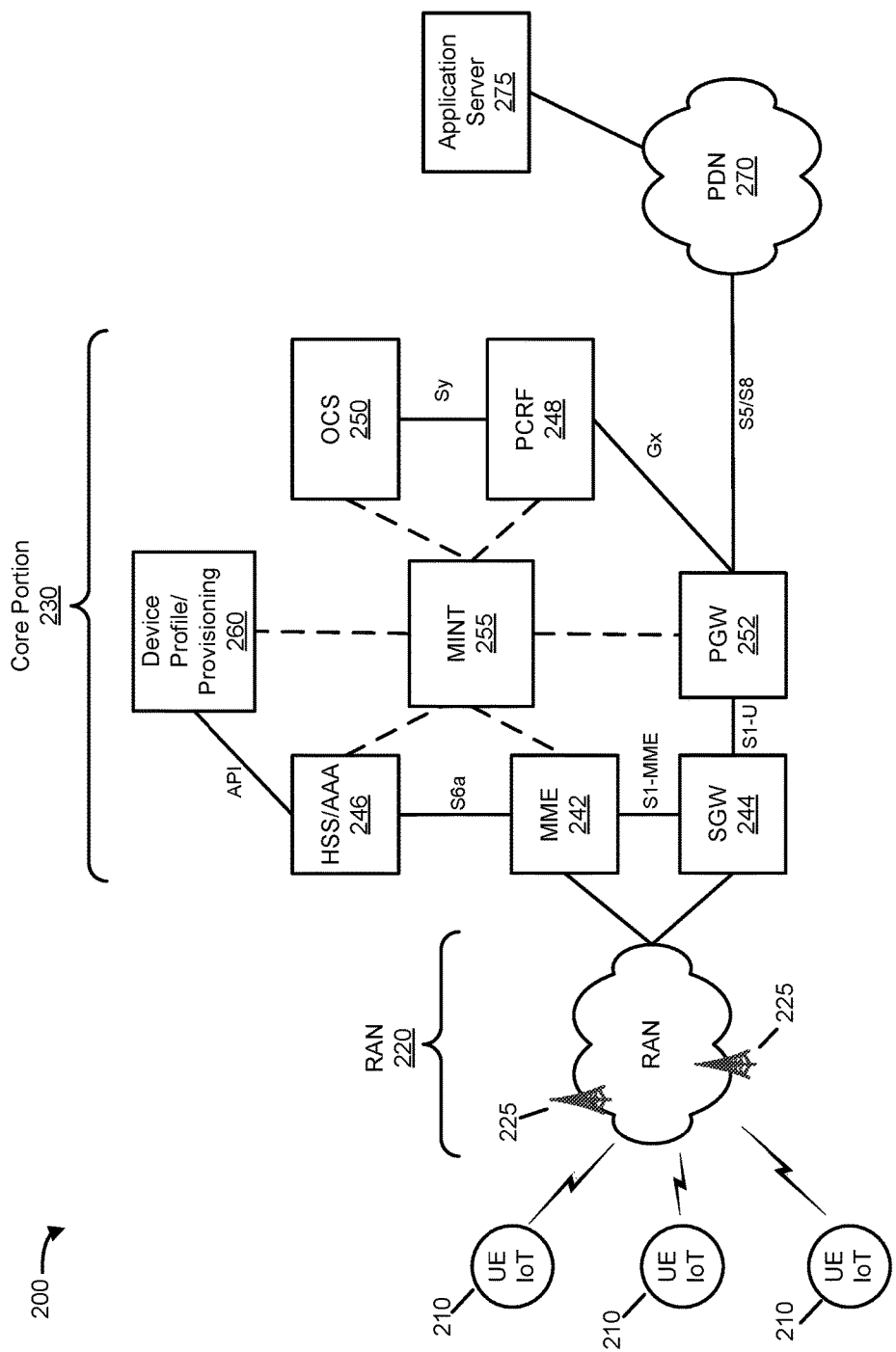
FIG. 2 is a diagram illustrating an example system in which systems and/or methods described herein may be implemented.

FIG. 2 is a diagram illustrating an example system 200 in which systems and/or methods described herein may be implemented. As illustrated, system 200 may include a number of UE IoT devices 210, which may obtain network connectivity from a cellular network. The cellular network may include both a Radio Access Network (RAN) 220 and a core portion 230 of the cellular network. In Third Generation Partnership Project (3GPP)-based cellular networks, core portion 230 may be referred to as the Evolved Packet Core (EPC). The techniques described herein may be particularly useful for supporting machine type communications, such as for supporting uplink or downlink transmissions for IoT devices (which may also be referred to as Machine Type Communication (MTC) devices or Narrowband-IoT devices). Accordingly, in the description that follows, UEs 210 may particularly include these devices. However, the techniques described herein may also be applicable to non-CIoT UEs. For brevity, a "UE IoT" may be simply referred to as a "UE" or "IoT device" herein.

RAN 220 may particularly include base stations, which, in the context of a 3GPP network, may be referred to as Evolved NodeBs (eNBs), and are illustrated as eNBs 225. eNBs 225 may provide the air (radio) interface for wireless connections with UEs 210. Core portion 230 may include an Internet Protocol ("IP")-based network. Core portion 230 may include a number of network devices, including a Mobility Management Entity (MME) 242, a Serving Gateway (SGW) 244, a Home Subscriber Server (HSS)/Authentication, Authorization and Accounting (AAA) server 246, a Policy and Charging Rules (PCRF) function component 248, an online charging system (OCS) 250, and a packet data network gateway (PGW 252). Additionally, consistent with aspects described herein, core portion 230 may include Machine Interface Network Treatment (MINT) component 255 and device profile/provisioning component 260. Although shown, in FIG. 2, as being included within core portion 230, in some implementations, MINT component 255 and/or device profile/provisioning component 260 may be implemented outside of core portion 230 or outside of the cellular network, such as connected to an external network (e.g., packet data network (PDN) 270)).

Through core portion 230, UEs 210 may communicate with an external network, such as PDN 270. For example, an operator of a network of IoT devices may control and/or collect data, from the IoT devices, using one or more application servers 275 that are connected to PDN 270.

UEs 210, as IoT devices, may each include a device that may implement one or more sensing components and a communication component. The sensing component may include, for example, a temperature sensor, a humidity sensor, a light sensor, a camera, a video camera, a geo-positioning element (e.g., a GPS component), and/or other sensors that generate or monitor data that relates to the environment of UE 210. The automated collection and communication of remote data, such as by UEs 210, may commonly be referred to as telemetry, and the collected data as telemetry data. The communication component may include a wireless or wired communication circuit that UE 210 may use to transmit the sensed data to another IoT device and/or to the cellular network. For example, the communication component may include a cellular radio.

Although not shown in FIG. 2, in a typical implementation, UEs that include user mobile devices, such as cellular telephones, may be present and connect to the cellular wireless network. That is, the cellular network may be operated to provide communications services to both CIoT devices and user mobile devices.

eNBs 225 may each include one or more network devices that receive, process, and/or transmit traffic destined for and/or received from UEs 210 (e.g., via an air interface). eNBs 225 may include antennas and other logic necessary to wirelessly communicate with UEs 210. eNBs 225 may additionally communicate with other network devices in the core portion of the wireless telecommunications network. Although referred to as an "eNB," eNB 225 may generally represent any base station and/or RAT node that is implemented in a cellular network as a network device designed to wirelessly communicate with UEs.

MME 242 may include one or more computation and communication devices that act as a control node for eNBs 225 and/or other devices that provide the air interface for the wireless telecommunications network. For example, MME 242 may perform operations to register UEs 210 with the cellular network, to establish user plane bearer channels (e.g., traffic flows), to hand off UE 210 to different eNBs 225, MMES, or another network, and/or to perform other operations. MME 242 may perform policing operations on traffic destined for and/or received from UEs 210.

SGW 244 may aggregate traffic received from one or more eNBs 225 and may send the aggregated traffic to an external network or device via PGW 252. Additionally, SGW 244 may aggregate traffic received from one or more PGWs 252 and may send the aggregated traffic to one or more eNBs 225. SGW 244 may operate as an anchor for the user plane during inter-eNB handovers and as an anchor for mobility between different telecommunication networks.

HSS/AAA 246 may include one or more devices that may manage, update, and/or store, in a memory associated with HSS/AAA 246, information associated with a subscriber (e.g., a subscriber associated with UE 210). The information may identify applications and/or services that are permitted for and/or accessible by the subscriber; a Mobile Directory Number (MDN) associated with the subscriber; bandwidth or data rate thresholds associated with the applications and/or services; and/or other information. The subscriber information may include an indication of whether a particular UE 210 is an IoT device. In some implementations, HSS/AAA 246 may additionally store the IoT profiles and/or may store an indication of the IoT profile(s) that apply to a particular UE 210. Additionally, or alternatively, HSS/AAA 246 may perform authentication, authorization, and/or accounting operations associated with the subscriber and/or a communication session with UE 210.

PCRF 248 may include one or more devices that may receive information regarding policies and/or subscriptions from one or more sources, such as subscriber databases and/or from one or more users. PCRF 248 may provide these policies to PGW 252 or another device so that the policies can be enforced. PCRF 248 may communicate with PGW 252 to ensure that charging policies are properly applied to locally routed sessions within the telecommunications network. For instance, after a locally routed session is terminated, PGW 252 may collect charging information regarding the session and provide the charging information to PCRF 248 for enforcement.

OCS 250 may include one or more devices that may function to determine and track charging amounts for subscribers. OCS 250 may function, together with PCRF 248 and MINT component 255, to provide policy and charging control functions for an operator of the cellular communications network.

MINT component 255 may include one or more devices to operate to aggregate RAN events for UEs 210, manage IoT profiles, and control the implementation of charging and/or access control policies based on the RAN events and IoT profiles. MINT component 255 may communicate with a number of other network devices in core portion 230. For example, MINT component 255 may expose an API to device profile/provisioning component 260, through which device profile/provisioning component 260 may provision new IoT devices for the cellular network. For example, a user (e.g., network operator or customer) of device profile/provisioning component 260 may, before deploying a new IoT device, communicate with MINT component 255 to assign the IoT device a particular IoT profile. As previously mentioned, the IoT profile may, for example, specify charging amounts based on RAN events that are associated with the IoT device.

MINT component 255 may communicate with MME 242, SGW 244, HSS/AAA 246, and/or PGW 252 to receive sensed data (e.g., telemetry data) from UEs 210. Additionally, MINT component 255 may connect to PCRF 248, such as via the Rx (or an extended Rx) interface, to receive or transmit UE policy information; and MINT component 255 may connect to OCS 250, such as via the Gy (or an extended Gy) interface, to communicate charging information with OCS 250. In one implementation, MINT component 255 may generate charges for IoT UEs 210 that are based on RAN events, while "normal" user-plane data usage charges may be applied normally by OCS 250. The final charges for the customer may then be based on both the RAN events and the normal user-plane data usage charges.

Device profile/provisioning component 260 may include one or more devices to enable interaction with other devices in core portion 230. Although illustrated as being included in core portion 230, device profile/provisioning component 260 may alternatively be implemented external to core portion 230, such as by being attached to PDN 270. In one implementation, device profile/provisioning component 260 may include a personal computer (e.g., laptop or desktop computer) that can be used to communicate, through APIs, to HSS/AAA 246 and/or MINT component 255. Alternatively or additionally, device profile/provisioning component 260 may represent an automated process that may be used to control the provisioning of IoT devices with the cellular network.

PDN 270 may include one or more packet networks, such as an Internet Protocol (IP) based packet network. PDN 270 may include a wide area network (WAN), a local area network (LAN), and/or combinations of WANs and LANs. Application servers or other computing devices, designed to control or aggregate data from UEs 210, may be connected to PDN 270.

Application server 275 may represent one or more devices that may be to control UEs 210 and/or collect data from UEs 210. As an example, when UEs 210 represent a sensor network of IoT devices, application server 275 may represent an application server that is designed to aggregate data that is sensed by the sensor IoT devices and control the operation of the sensor IoT devices (e.g., control the period between uploads of each IoT device, control what is measured, etc.).

A number of communication interfaces, between the various components of system 200, are illustrated in FIG. 2. The communication interfaces may include 3GPP standardized interfaces. As illustrated, the interfaces may include: an S1-U interface between SGW 244 and PGW 252, an S1-MME interface between SGW 244 and MME 242, an S6a interface between MME 242 and HSS/AAA 246, an S5/S8 interface between PGW 252 and PDN 270, a Gx interface between PGW 252 and PCRF 248, and an Sy interface between PCRF 248 and OCS 250.

The quantity of devices and/or networks, illustrated in FIG. 2, is provided for explanatory purposes only. In practice, there may be additional devices and/or networks; fewer devices and/or networks; different devices and/or networks; or differently arranged devices and/or networks than illustrated in FIG. 2. Alternatively, or additionally, one or more of the devices of system 200 may perform one or more functions described as being performed by another one or more of the devices of system 200.

Figure 3:
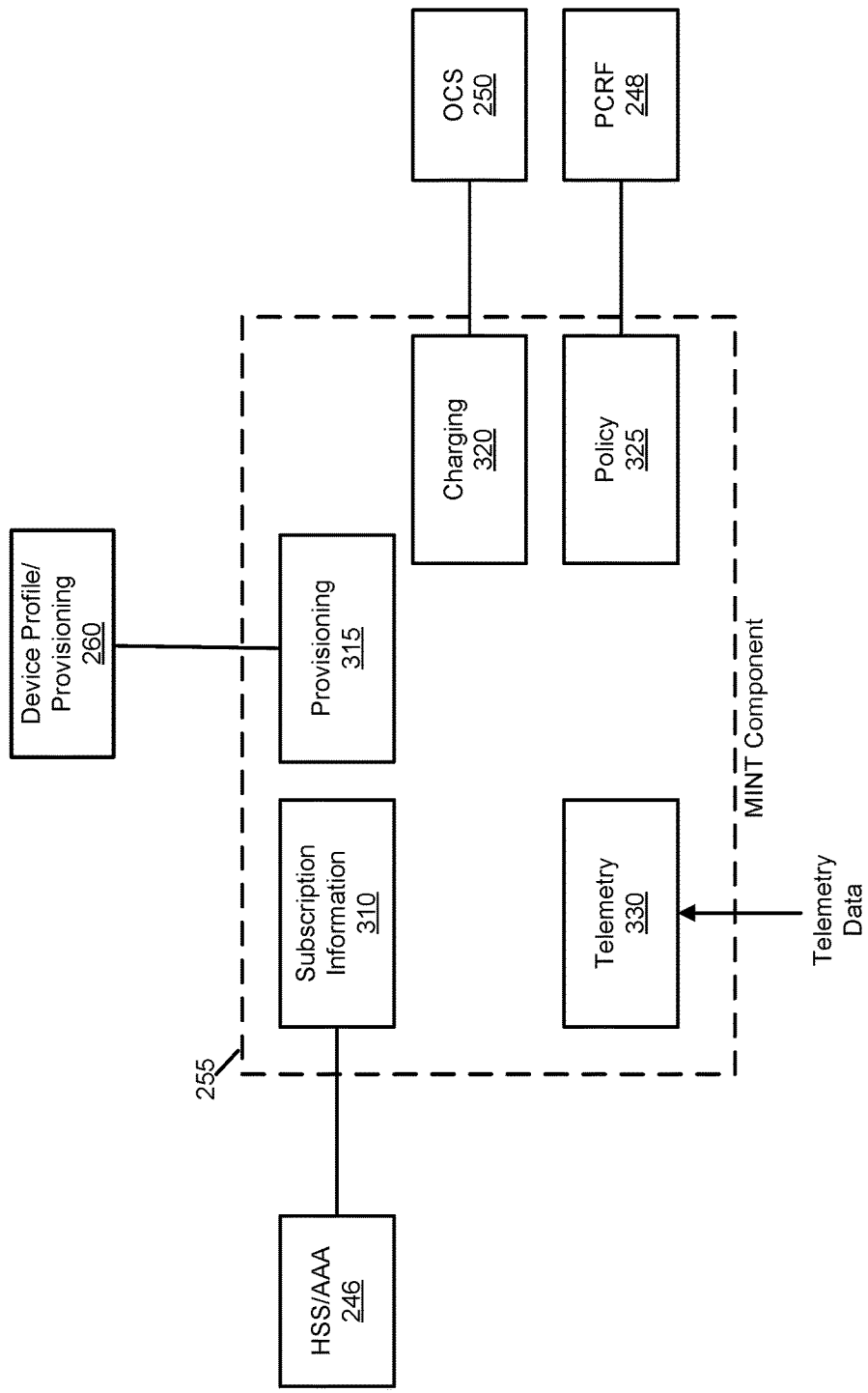
FIG. 3 is a diagram illustrating example functional components of the MINT component shown in FIG. 2.

FIG. 3 is a diagram illustrating example functional components of MINT component 255. As shown in FIG. 3, MINT component 255 may include subscription information component 310, provisioning component 315, charging component 320, policy component 325, and telemetry component 330. Physically, MINT component 255 may include one or more computing devices, which may be co-located or geographically distributed. In some implementations, MINT component 255 may include a network of devices in which intra-device communication is implemented using Software Defined Network (SDN) techniques. The functional components illustrated in FIG. 3 may be performed by one or more of the computing devices associated with MINT component 255. In some implementations, MINT component 255 may be designed to expandable via software "plugins," so that additional components can be added as needed.

Subscription information component 310 may receive subscription information relating to the services that are subscribed to by the users of the cellular communications network. The subscription information may be received from HSS/AAA 246. Provisioning component 315 may include functionality relating to initially adding IoT UEs 210 to the cellular communication network, removing IoT UEs 210 from the network, or other functions relating to the setup of IoT UEs 210. As previously mentioned, provisioning component may be accessed through an API defined for provisioning component 315. Provisioning component 315 may potentially be accessed by end-users (e.g., owners of UEs 210) and may allow the user to associate IoT profiles for different UEs managed by the user. In some implementations, through device profile/provisioning component 260, users may upload or otherwise define new IoT profiles at provisioning component 315.

Charging component 320 may include functionality to communicate charging data with OCS 250. For example, charging component 320 may transmit charges, associated with UEs 210 to OCS 250. Charging component 320 may generally operate to integrate the charging aspects of MINT component 255 into the existing charging infrastructure of core portion 230. Policy component 325 may include functionality to communicate with PCRF 248 to obtain or configure network policies, such as traffic routing or traffic limiting policies associated with UEs 210. In some implementations, IoT profiles may be stored by PCRF 248 and may be provided to policy component 325.

Telemetry component 330 may include functionality to aggregate RAN events, or other data, relating to the operation of UEs 210. Telemetry component 330 may receive the RAN event information from one or more devices in the telecommunications network, such as from eNBs 225, MMES 242, SGWs 244, and/or PGWs 252. The RAN event information may be used by, for example, charging component 320 and/or policy component 325, to generate charges based on the RAN events and based on the IoT profiles.

As previously mentioned, MINT component 255 may store IoT profiles that may be associated with UEs 210. The IoT profiles may include a description of the expected or allowed amount of RAN impactful events that may be permitted for a particular UE in a particular time period. Based on the IoT profiles and based on the RAN events associated with an IoT device or group of devices, MINT component 255 may incorporate automatic feedback control to act on the out-of-profile behaviors.

Figure 4:
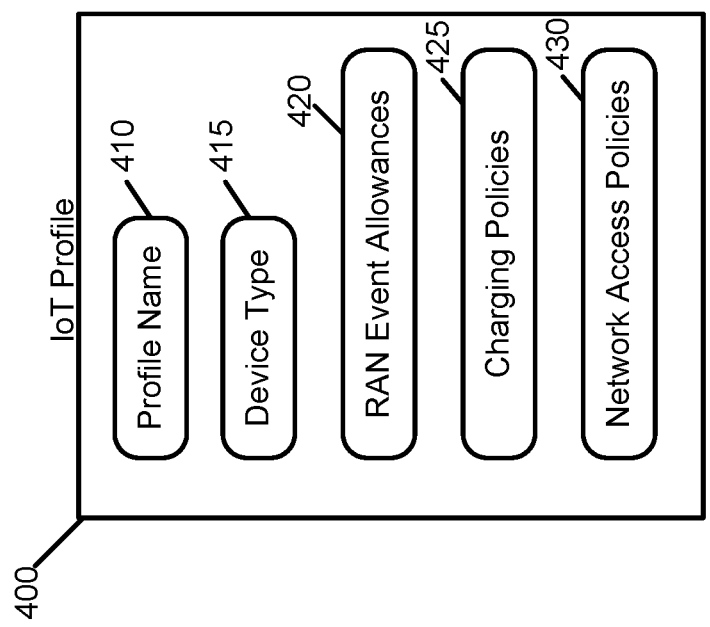
FIG. 4 is a diagram illustrating elements of an example IoT profile that may be maintained by the MINT component.

FIG. 4 is a diagram illustrating elements of an example IoT profile 400 that may be maintained by MINT component 255. Each IoT profile 400 be stored, as a data structure, by, for example, one or more of the functional components of MINT component 255. As shown, IoT profile 400 may include a profile name section 410, a device type section 415, RAN event allowances section 420, charging policies section 425, and network access policies section 430.

Profile name section 410 may include a name or other identifier assigned to the particular IoT profile. A name or other identifier may be assigned by, for example, the operator of the cellular network or the operator of particular UEs 210. Device type section 415 may include an indication of one or more IoT device types for which IoT profile 400 is applicable. For example, different IoT device types may include temperature sensors, wearable devices, GPS tracking devices, agricultural sensor devices, or combination thereof. Device type section 415 may generally be used to group different IoT devices into different categories, either by the operator of the cellular network or the operator of the IoT devices. In some implementations, each IoT may be associated with an IoT device type (e.g., stored at HSS/AAA 246) which may correspond to a default IoT profile for the device type. In some implementations, IoT profiles may be hierarchically defined. For example, a base "sensor" type IoT profile may be defined which may apply to all IoT sensor devices. More specific sensor type IoT profiles, such as a "temperature sensor" type IoT profile and an "agriculture" type IoT profile may be hierarchically defined beneath the "sensor" IoT profile. An IoT devices that is a "sensor" type but is also an "agriculture" type may use the more specific "agriculture" type IoT profile, while an IoT device that is a "sensor" type but is neither a "temperature sensor" nor "agriculture" type may be associated with the more general "sensor" type.

RAN event allowances section 420 may include thresholds or other rules or policies that indicate the amount of RAN events that are permitted for IoT devices associated with IoT profile 400. In some implementations, RAN event allowances section 420 may additionally include indications of other network resource limits, such as bandwidth limits for user data traffic. The policies defined in RAN event allowances section 420 may generally relate to RAN event-based policies (e.g., based on device attach/detach, idle/active behavior); time-based policies (e.g., the duration of active Radio Access Bearers); and/or a combination of event-based and time-based policies (e.g., number of idle/active transitions per day and a maximum duration in the active state).

Charging policies section 425 and network access policies 430 may define the charging and network access policies, respectively, for IoT devices associated with IoT profile 400. As previously mentioned, charging policies may include the charges that will be accrued for different RAN events or other events. The network access policies may include bandwidth limits, RAN event limits, or other network restrictions that may be applicable to a particular IoT device based on the RAN events associated with the IoT device. For example, a UE IoT may be permitted a certain threshold number of radio attach and detach events per hour. If the UE IoT device exceeds the threshold, MINT component 255 may communicate with OCS 250 to assess additional charges to the customer or communicate with PCRF 248, eNB 225, MME 242, SGW 244, and/or PGW 252 to limit network access to the IoT device (e.g., eNB 225 may be instructed to refuse additional radio attach events).

One example of a data structure that defines different types of RAN events that may be tracked by MINT component 255 is illustrated in Table I. In the RAN event tracking model of Table I, two types of RAN events are particularly defined: (1) connection-based events and (2) data-based events. The connection-based events (defined in the Container "ConnHit" in Table I) may include events, and tracking of the events, relating to UE attach and detach procedures with the RAN. As shown, RRC Attach events and RRC Detach events may be tracked. Additionally, the rate of the attach/detach events may also be tracked ("HitFrequency"). The rate of the attach/detach events may be the total observed number of attach/detach events per unit time. The data-based events (defined in the Container "DataHit" in Table I) may include events, and tracking of the events, relating to the creation and release of radio data bearers. As shown, the tracked events may include radio bearer creation events ("ServiceRequest") and release ("S1Release" events may be tracked). Additionally, the rate of the bearer creation/release events may also be tracked ("HitFrequency"), which may correspond to the radio access bearer (RAB)/S1 bearer transitions per unit of time.

TABLE I

Container ConnHit {
   description "Connection Event";
   leaf Attach {
      type RRC;
      description "Radio Access Attach";}
   leaf Detach {
      type RRC;
      description "Radio Access Detach";}
   leaf HitFrequency {
      type RATE;
      description "Number of Attach/Detach transitions per unit time";}}
Container DataHit {
   description "Data Bearer Activation Event";
   leaf ServiceRequest {
      type BEARER;
      description "Service Request";}
   leaf S1Release {
      type BEARER;
      description "S1 Release";}
   leaf HitFrequency {
      type RATE;
      description "Number of RAB/S1 bearer transitions per unit time";}

Figure 5:
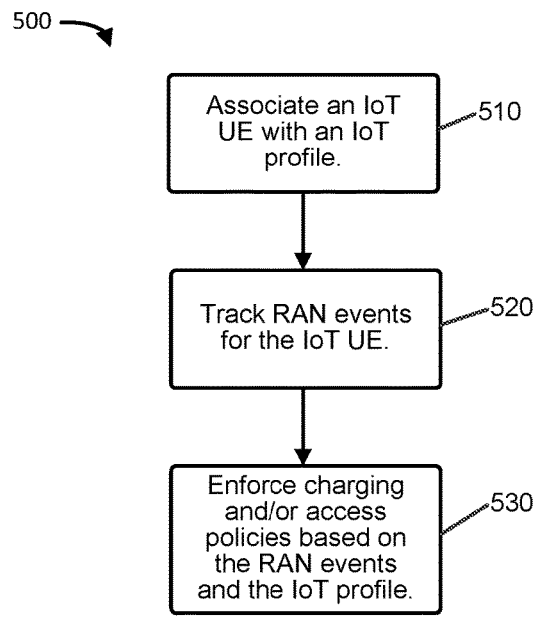
FIG. 5 is a flow chart illustrating an example process for enforcing charging or access policies for IoT UEs.

FIG. 5 is a flow chart illustrating an example process 500 for enforcing charging or access policies for IoT UEs. Process 500 may be implemented by, for example, MINT component 255. In some implementations, process 500 may be implemented by other devices associated with the cellular communications network, such as by one or more of the network devices shown in FIG. 2.

Process 500 may include associating an IoT UE with an IoT profile (block 510). As previously mentioned, IoT profiles may be defined by operators of the IoT devices and/or by an operator of the cellular network. Device profile/provisioning component 260 may be used to configure MINT component 255 to store an IoT profile and to associate particular IoT profiles with particular IoT UEs.

Process 500 may further include tracking RAN events for the IoT UE (block 520). The RAN events, which may include radio attach/detach events, radio bearer establishment/release events, the rate of occurrence of these events, or other RAN-based events, may be detected by one or more devices in the telecommunications network (e.g., by eNBs 225, MME 242, SGW 244, and/or PGW 252), and provided to MINT component 255. MINT component 255 may store and aggregate the RAN events UE IoT devices 210. The RAN events may be initiated by UE IoT devices 210 and may be received as messages from the one or more devices in the telecommunications network. Each message may include an identification of Process 500 may further include enforcing charging and/or access policies based on the RAN events and the IoT profile (block 530). For example, as previously mentioned, MINT component 255 may charge fees to the operator of the IoT UE, such as by charging additional fees when the amount of certain RAN events exceed thresholds in the corresponding IoT profile. Alternatively or additionally, network access policies may be enforced based on the occurrence of the RAN events.

As one example scenario relating to the application of process 500, assume a situation in which IoT device 210 makes relatively frequent, such as every 5 to 30 seconds, transitions between active and idle mode, with short-lived (e.g., sub-second) data transmissions when in active mode. This can adversely impact the RAN and the core network in a number of ways, including subjecting the RAN to frequent service request and S1 release signaling cycles at eNB 225, and potentially resulting in frequent S1-U bearer modifications at SGW 244. In this situation, it may be desirable that if IoT device 210 matches or is associated with a particular profile, such as a profile for an Automated Teller Machine (ATM), then profile specific event-based charging may be applied, such as an event-based surcharge for the active/idle transitions and/or for the service request signaling cycles. In some implementations, when the IoT device does not match an IoT profile or is not associated with a profile, then a default IoT profile may be applied, such as one that includes a network access policy that results in detaching of the IoT device after a defined number of RAN events (and potentially also charging for the RAN events).

As a second example relating to the application of process 500, assume a situation in which IoT device 210 is persistently holding radio access bearers without transitioning to a network idle state. This can negatively impact the RAN by using radio resources to maintain the radio access bearers. In this situation, it may be desirable that if IoT device 210 matches or is associated with a particular IoT profile, such as a profile for a supervisory control and data acquisition (SCADA) type IoT device, then profile specific event-based charging may be applied, such as charging for the radio access bearers based on total amount of time for which the radio access bearers are maintained. When IoT device 210 does not match a IoT profile, the default IoT profile may be applied.

In some implementations, an IoT profile may be applied to a group of IoT devices. For example, a large number of IoT devices may be associated with a single IoT profile in which RAN events for the group may be aggregated. Charging and access policies may be enforced based on the aggregated RAN events.

Figure 6:
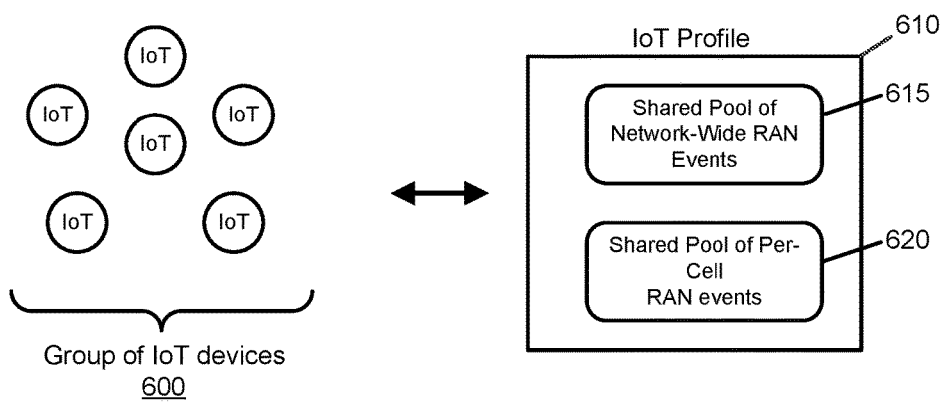
FIG. 6 is a diagram illustrating an example of aggregating RAN events based on a single IoT profile.

FIG. 6 is a diagram illustrating an example of aggregating RAN events based on a single IoT profile. A group of IoT devices 600 may include a number of IoT devices that are to be considered as a single group for at least some aspects of the corresponding IoT profile. For example, IoT devices 600 may correspond to a group of sensor devices associated with a particular manufacturer. As another example, IoT devices 600 may be wearable devices that are sold by a particular vendor, such as IoT devices that are embedded in shoes. IoT profile 610 may be associated with IoT devices 600. IoT profile 600 may include some RAN event allowances that are shared, on a network wide basis, with the group of IoT devices 600 (shown as Shared Pool of Network-Wide RAN Events 615). Additionally or alternatively, IoT profile 600 may include some RAN event allowances that are shared on a smaller scale, such as RAN event allowances that are shared per cell (shown as Shared Pool of Per-Cell RAN Events 620). As a more concrete example, IoT devices 600, may be allocated, at any one time, a certain maximum number of radio bearers throughout the cellular network. Additionally, on a per-cell basis, IoT devices may be allocated a certain maximum number of attach/detach requests per unit of time (e.g., per hour). Excess charges may be applied, to the customer associated with IoT devices 600, when the IoT devices 600, in aggregate, exceed these RAN event limits.

Figure 7:
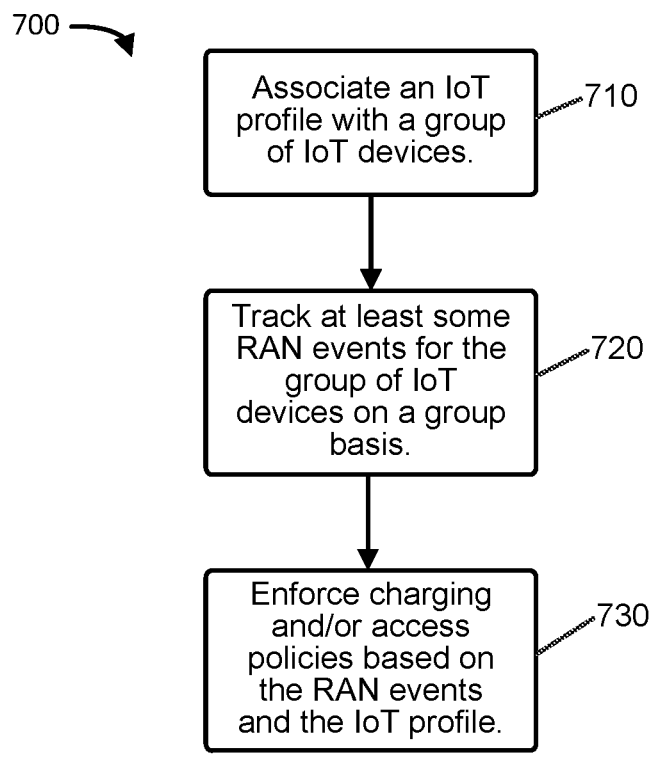
FIG. 7 is a flow chart illustrating an example process for enforcing charging or access policies for a group of IoT UEs for which RAN events are to be aggregated.

FIG. 7 is a flow chart illustrating an example process 700 for enforcing charging or access policies for a group of IoT UEs for which RAN events are to be aggregated. Process 700 may be implemented by, for example, MINT component 255 or by other devices associated with the cellular communications network.

Process 700 may include associating an IoT profile with a group of IoT devices (block 710). The IoT profile may be defined to apply to all UE IoT devices of a particular type or all UE IoT devices of a particular manufacturer or customer. In one implementation, device profile/provisioning component 260 may be used to enumerate each UE IoT (such as via a unique IoT identifier) that is associated with a particular IoT profile.

Process 700 may further include tracking at least some RAN events for the group of IoT devices on a group basis (block 720). The RAN events, which may include radio attach/detach events, radio bearer establishment/release events, the rate of occurrence of these events, or other RAN-based events, may be detected by one or more devices in the telecommunications network, and provided to MINT component 255. Different RAN events, associated with different UE IoTs of the same group, may be aggregated by MINT component 255.

Process 700 may further include enforcing charging and/or access policies based on the RAN events and the IoT profile (block 730). For example, fees may be charged, or network access restrictions applied, based on a group-level view of the RAN events. In one implementation, IoT devices in a group may be charged fees based on the cumulative average number of RAN events for the number of devices in the group. Alternatively or additionally, fees may be charged based on a statistical oversubscription factor based on the number of IoT devices in the group and based on the historical variance of the occurrence of RAN events for the group.

Figure 8:
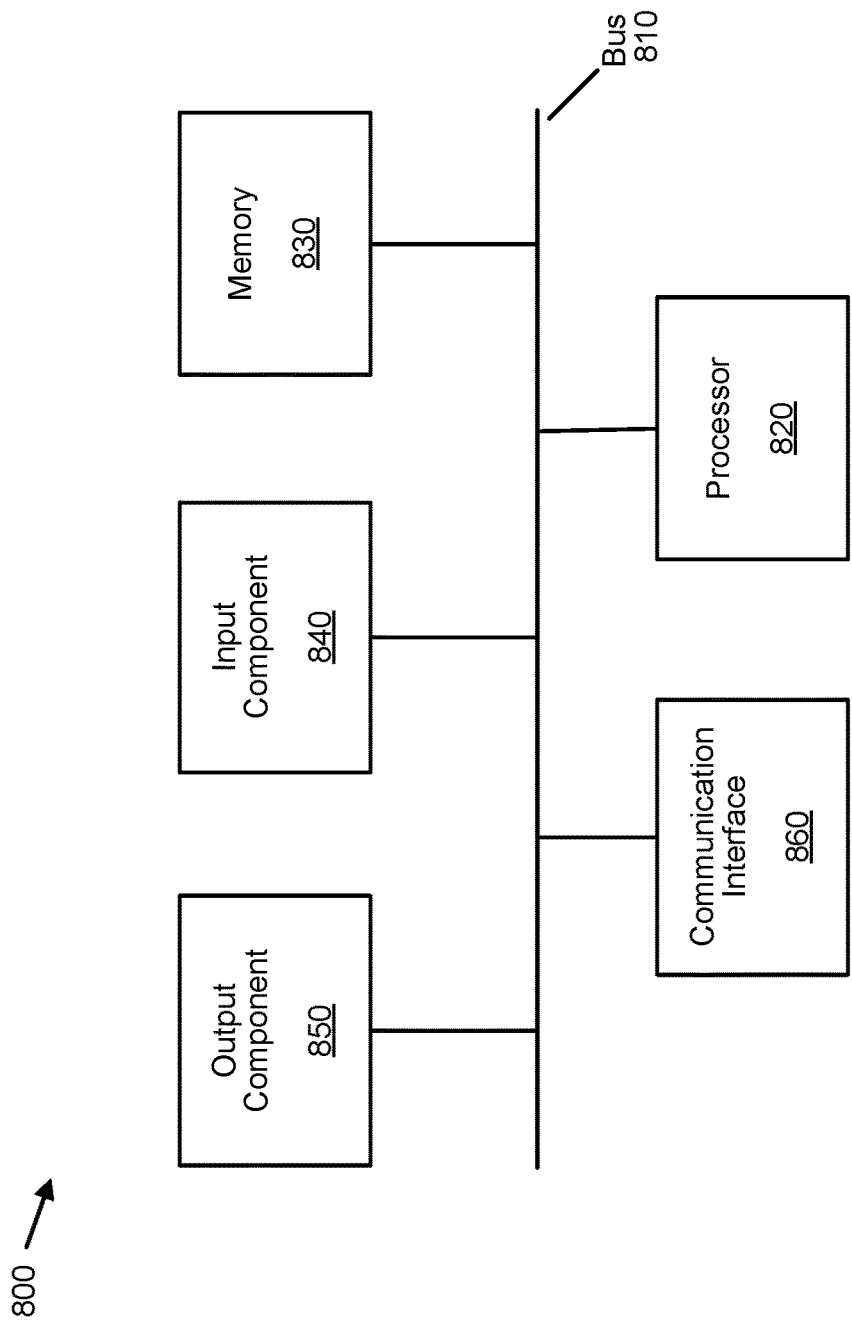
FIG. 8 is a diagram of example components of a device.

FIG. 8 is a diagram of example components of a device 800. Each of the devices illustrated in FIG. 1-4 or 6 may include one or more devices 800. Device 800 may include bus 810, processor 820, memory 830, input component 840, output component 850, and communication interface 860. In another implementation, device 800 may include additional, fewer, different, or differently arranged components. As described herein, a component may be implemented by hardware circuitry, software logic, and/or some combination thereof.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes (LEDs), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope set forth in the claims that follow. The specification and drawings are accordingly to be regarded in an illustrative rather than restrictive sense.

For example, while a series of blocks/acts have been described with regard to FIGS. 5 and 7, the order of the blocks/acts may be modified in other implementations. Further, non-dependent blocks may be performed in parallel. Similarly, while series of communications have been described with regard to several of the figures provided herein, the order or nature of the communications may potentially be modified in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operations and behaviors of the aspects that were described without reference to the specific software code—it being understood that software and control hardware could be designed to implement the aspects based on the description herein.

Further, certain portions may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be used in accordance with all applicable laws concerning protection" of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A network device, for a cellular communication network, comprising:
   one or more processors; and
   a computer-readable medium including processing instructions, that when executed by the one or more processors, cause the one or more processors to:
   maintain a plurality of Internet of Things (IoT) profiles, each of the IoT profiles describing resource limits relating to events that occur in a Radio Access Network (RAN) of the cellular communications network;
   track RAN events that were initiated by an IoT device, the IoT device being associated with an IoT profile of the plurality of IoT profiles, the RAN events including Radio Resource Control (RRC) communications initiated by the IoT device and made with an Evolved NodeB (eNB) in the cellular network;

determine whether an amount of RAN events that were initiated by the IoT device exceeds the resource limits in the associated IoT profile; and enforce charging or network access policies, for the IoT device, based on the determination.

2. The network device of claim 1, wherein, when tracking the RAN events, the one or more processors are further to:

receive indications of the RAN events, and the IoT device that initiated the RAN events, from network devices associated with the cellular communications network, the network devices including the Evolved NodeB (eNB); and store the indications of the RAN events.

3. The network device of claim 1, wherein the RAN events include at least one of:

RRC attach and detach events; and radio bearer request and release events.

4. The network device of claim 3, wherein the RRC attach and detach events, and the radio bearer request and release events, are tracked based on the rate of occurrence of the events.

5. The network device of claim 1, wherein the plurality of IoT profiles include at least some IoT profiles that are hierarchically defined with respect to other IoT profiles.

6. The network device of claim 1, wherein, when enforcing the charging or network access policies, the one or more processors are further to:

apply additional charges to an account associated with the IoT device when the IoT device exceeds the resource limits, the additional charges being determined based on the associated IoT profile.

7. The network device of claim 1, wherein at least some of the IoT profiles define resource limits for a group of IoT devices and wherein the determination of whether an amount of RAN events exceeds the resource limits is based on aggregating the RAN events for the group of IoT devices.

8. The network device of claim 1, wherein the plurality of IoT profiles include different IoT profiles for different types of IoT devices.

9. A method, implemented by a network device, comprising:

maintaining a plurality of Internet of Things (IoT) profiles, each of the IoT profiles describing resource limits for one or more IoT devices, the resource limits including limits relating to events that occur in a Radio Access Network (RAN) of a cellular communications network;

tracking RAN events that were initiated by an IoT device, the IoT device being associated with an IoT profile of the plurality of IoT profiles, the RAN events including Radio Resource Control (RRC) communications initiated by the IoT device and made with an Evolved NodeB (eNB) in the cellular network;

determining whether an amount of RAN events that were initiated by the IoT device exceeds the resource limits in the associated IoT profile; and enforcing charging or network access policies, for the IoT device, based on the determination.

10. The method of claim 9, further including:

receiving indications of the RAN events, and the IoT device that initiated the RAN events, from network devices associated with the cellular communications network, the network devices including the Evolved NodeB (eNB); and storing the indications of the RAN events.

11. The method of claim 9, wherein the RAN events include at least one of:

RRC attach and detach events; and radio bearer request and release events.

12. The method of claim 11, wherein the RRC attach and detach events, and the radio bearer request and release events, are tracked based on the rate of occurrence of the events.

13. The method of claim 9, wherein the plurality of IoT profiles include at least some IoT profiles that are hierarchically defined with respect to other IoT profiles.

14. The method of claim 9, further comprising:

applying additional charges to an account associated with the IoT device when the IoT device exceeds the resource limits, the additional charges being determined based on the associated IoT profile.

15. The method of claim 9, wherein at least some of the IoT profiles define resource limits for a group of IoT devices and wherein the determination of whether an amount of RAN events exceeds the resource limits is based on aggregating the RAN events for the group of IoT devices.

16. A non-transitory computer-readable medium containing one or more program instructions, for execution by one or more processors, to:

maintain a plurality of Internet of Things (IoT) profiles, each of the IoT profiles describing resource limits for one or more IoT devices, the resource limits including limits relating to events that occur in a Radio Access Network (RAN) of a cellular communications network;

track RAN events that were initiated by an IoT device, the IoT device being associated with an IoT profile of the plurality of IoT profiles, the RAN events including Radio Resource Control (RRC) communications initiated by the IoT device and made with an Evolved NodeB (eNB) in the cellular network;

determine whether an amount of RAN events that were initiated by the IoT device exceeds the resource limits in the associated IoT profile; and enforce charging or network access policies, for the IoT device, based on the determination.

17. The non-transitory computer-readable medium of claim 16, wherein, when tracking the RAN events, the one or more program instructions, when executed by the one or more processors are further to:

receive indications of the RAN events, and the IoT device that initiated the RAN events, from network devices associated with the cellular communications network, the network devices including the Evolved NodeB (eNB); and store the indications of the RAN events.

18. The non-transitory computer-readable medium of claim 16, wherein the RAN events include at least one of:

RRC attach and detach events; and radio bearer request and release events.

19. The non-transitory computer-readable medium of claim 18, wherein the RRC attach and detach events, and the radio bearer request and release events, are tracked based on the rate of occurrence of the events.

20. The non-transitory computer-readable medium of claim 16, wherein the plurality of IoT profiles include at least some IoT profiles that are hierarchically defined with respect to other IoT profiles.

* * * * *